US012779558B2

(12) United States Patent
Anghileri et al.

(10) Patent No.: US 12,779,558 B2
(45) Date of Patent: Nov. 3, 2026

(54) DRILL BLADE FOR DRILLING HARD MATERIALS AND DRILL BIT

(71) Applicant: Robert Bosch GmbH, Stuttgart (DE)

(72) Inventors: Massimo Anghileri, Solothurn (CH); Haifeng Ji, Zhejiang (CN); Andrea Pedretti, Rivera (CH)

(73) Assignee: Robert Bosch GmbH, Stuttgart (DE)

( * ) Notice: Subject to any disclaimer, the term of this patent is extended or adjusted under 35 U.S.C. 154(b) by 824 days.

(21) Appl. No.: 18/260,724

(22) PCT Filed: Aug. 28, 2020

(86) PCT No.: PCT/CN2020/112058

§ 371 (c)(1),
(2) Date: Jul. 7, 2023

(87) PCT Pub. No.: WO2022/041109

PCT Pub. Date: Mar. 3, 2022

(65) Prior Publication Data

US 2024/0300033 A1 Sep. 12, 2024

(51) Int. Cl.
*B23B 51/00* (2006.01)

(52) U.S. Cl.
CPC ...... *B23B 51/0002* (2022.01); *B23B 2226/75* (2013.01); *B23B 2251/04* (2013.01); *B23B 2251/14* (2013.01); *B23B 2251/18* (2013.01); *B23B 2251/287* (2013.01); *B23B 2265/12* (2013.01)

(58) Field of Classification Search
CPC ............ B23B 51/0002; B23B 51/0006; B23B 51/0095; B23B 51/02; B23B 2226/75; B23B 2251/04; B23B 2251/14; B23B 2251/18; B23B 2251/287; B23B 2265/12
See application file for complete search history.

(56) References Cited

U.S. PATENT DOCUMENTS 4,231,692 A 11/1980 Brabetz et al.
4,635,738 A 1/1987 Schillinger et al.
(Continued)

FOREIGN PATENT DOCUMENTS

CN 2875659 Y 3/2007
CN 101041190 A 9/2007
(Continued)

OTHER PUBLICATIONS

Translation of CN2875659 (Year: 2007).*
(Continued)

*Primary Examiner* — Matthew P Travers
(74) *Attorney, Agent, or Firm* — Maginot, Moore & Beck LLP

(57) ABSTRACT

A drill bit for drilling a hard material includes a drill bit blade defining an axis of rotation and including a first side and a second side positioned respectively on first and second lateral sides of the axis of rotation. The drill bit blade further includes a blade tip point that is laterally biased relative to the axis of rotation, and a first blade edge and a second blade edge starting at the blade tip point and ending at the first side and second side, respectively. An angular bisector between the first and second blade edges is inclined at an angle relative to the axis of rotation.

9 Claims, 5 Drawing Sheets

(56) References Cited

U.S. PATENT DOCUMENTS

| | | | | |
|---|---|---|---|---|
| 2007/0172323 | A1 * | 7/2007 | Radkowitsch | B23B 41/02 408/59 |
| 2020/0254533 | A1 * | 8/2020 | Wenzelburger | B23B 51/0486 |

FOREIGN PATENT DOCUMENTS

| | | | | | |
|---|---|---|---|---|---|
| CN | 101678473 | A | | 3/2010 | |
| CN | 203495300 | U | | 3/2014 | |
| CN | 106001709 | A | * | 10/2016 | B23B 51/02 |
| CN | 206952229 | U | | 2/2018 | |
| CN | 207983714 | U | | 10/2018 | |
| GB | 1008029 | A | | 10/1965 | |
| JP | S49-103290 | A | | 9/1974 | |
| WO | 93/17216 | A1 | | 9/1993 | |

OTHER PUBLICATIONS

Translation of JPS49103290 (Year: 1974).*

International Search Report corresponding to PCT Application No. PCT/CN2020/112058, mailed May 26, 2021 (Chinese and English language document) (8 pages).

* cited by examiner

DRILL BLADE FOR DRILLING HARD MATERIALS AND DRILL BIT

This application is a 35 U.S.C. § 371 National Stage Application of PCT/CN2020/112058, filed on Aug. 28, 2020, the disclosure of which is incorporated herein by reference in its entirety.

The present application relates to a drill bit blade for drilling hard materials and a drill bit using the blade.

BACKGROUND

Many of drill bits used to drill hard materials have symmetrical drill bit blades. As the drill bit blades are drilled into a workpiece, each blade edge is under pressure from the workpiece. Because two blade edges are symmetrical, both edges contact the workpiece over their full length, maintaining a larger area of contact between the two blade edges and the workpiece. It has been found that the drilling speed of the drill bit is associated with the contact pressure between the blade edge and the workpiece, and the greater the area of contact between the blade edge and the workpiece, the smaller the pressure between them, which causes the drilling speed to decrease. To increase the pressure between the blade edge and the workpiece so to increase the drilling speed, reducing the blade thickness or increasing the sharpness of the blade edge may be considered. However, this may result in faster blade depletion.

An eccentric drill bit blade 1 of the prior art is shown in FIG. 1, where a tip point A between two blade edges 2*a* and 2*b* is biased by a lateral distance relative to an axis of rotation O of the drill bit, the two blade edges are at the same angle of inclination relative to the axis of rotation O such that the angular bisector X between the two blade edges is parallel to the axis of rotation O. When such a drill bit blade 1 is drilled into a workpiece 3, only the blade edge portion (represented in the thick line segment in FIG. 2) located on one side of the axis of rotation O (the side where the tip point A is located) is subject to pressure P from the workpiece and genuinely cuts the workpiece, so the intensity of pressure between the blade edge portion involved in cutting and the workpiece increases, which can increase the drilling speed. However, the workpiece pressure P that such blade is subjected to is from only one side relative to the axis of rotation O and the other side is free of the workpiece pressure, so the blade is subjected to a one-sided lateral component during drilling, which is detrimental to the drilling precision and blade life.

Another eccentric drill bit blade 1 of the prior art is shown in FIG. 2, where a tip point A between two blade edges 2*a* and 2*b* is located on an axis of rotation O of a drill bit, but the two blade edges have different angles of inclination relative to the axis of rotation O such that an angular bisector X between the two blade edges is inclined at an angle relative to the axis of rotation O. When such a blade is drilled into a workpiece, likewise, a blade edge on only one side (shown in the thick line segment in the figure) is subject to pressure P from the workpiece. Thus, although the drilling speed can be increased, the blade is also subject to a one-sided lateral component during drilling, which is detrimental to the drilling precision and blade life.

SUMMARY

The present application is intended to provide an eccentric blade for drilling a hard material and a bit using the eccentric blade, which can improve the drilling precision while ensuring drilling quality and blade life.

According to one aspect of the present application, there is provided a drill bit blade for drilling a hard material, defining an axis of rotation and including:

- a first side and a second side positioned respectively on first and second lateral sides of the axis of rotation;
- a blade tip point that is laterally biased by a length of lateral bias distance relative to the axis of rotation; and
- a first blade edge and a second blade edge starting at the blade tip point and ending at the first side and second side, respectively;
- where an angular bisector between the first and second blade edges is inclined at an angle of inclination relative to the axis of rotation.

In a feasible embodiment, an inclination direction of the angular bisector between the first and second blade edges relative to the axis of rotation is set such that the angular bisector is axially rearward relative to the blade tip point at an intersection or nearest point of the axis of rotation.

In a feasible embodiment, axial positions of terminal points of the first and second blade edges on the first and second sides are different from one another.

In a feasible embodiment, the blade tip point is biased from the axis of rotation toward a second lateral side, and the axial position of the second blade edge on a terminal point of the second side is rearward than the axial position of the first blade edge on a terminal point of the first side.

In a feasible embodiment, the lateral bias distance and the angle of inclination are designed in combination such that: during a drilling process, the first and second blade edges each have an effective cutting section that is involved in drilling of a workpiece material and a non-cutting section that is not involved in the drilling of the workpiece material.

In a feasible embodiment, the lateral bias distance and the angle of inclination are further designed in combination to achieve one or more of the following optimization objectives:

- a difference between a length of the first blade edge and a length of the second blade edge is minimized, e.g., less than a preset length difference limit value;
- during the drilling process, a difference between an effective cutting section length of the first blade edge and an effective cutting section length of the second blade edge is minimized, e.g., less than a preset effective cutting length difference limit value; and
- during the drilling process, the first and second blade edges bear a maximum degree of counteract to each other of lateral components of an active force from the workpiece material, e.g., lateral components on both sides produce a lateral counter-force that is less than a preset lateral force limit value.

In a feasible embodiment, a distance of the blade tip point laterally biased relative to the axis of rotation is greater than 0, less than a drilling radius of the drill bit blade, preferably less than half of the drilling radius, particularly less than ⅓ of the drilling radius.

In a feasible embodiment, the angular bisector between the first and second blade edges is inclined at an angle greater than 0 degrees, less than 45 degrees, preferably less than 30 degrees relative to the axis of rotation.

In a feasible embodiment, at least one of the first and second blade edges consists of two or more sequentially connected edge segments.

According to one aspect of the present application, there is provided a drill bit for drilling a hard material, including:

the drill bit blade previously described, which is mounted, e.g., welded onto a drill bit body.

According to the present application, the drill bit blade has a tip point that is eccentric relative to the axis of rotation of the drill bit and a blade edge center line (angular bisector of the blade edge) that is inclined at an angle relative to the axis of rotation of the drill bit. During drilling, on both sides of the axis of rotation of the drill bit, each blade edge has a portion that contacts a workpiece. As a result, the actual area of contact between the blade edge and the workpiece is reduced, the intensity of pressure may increase, and the drilling speed may increase. In addition, the workpiece exerts pressure on the blades on both sides of the axis of rotation of the drill bit, and lateral components of the pressure are at least partially counteracted to increase the drilling precision and blade life.

DETAILED DESCRIPTION

Various practical embodiments of a drill bit blade and a drill bit according to the present application are described below with reference to the figures.

A drill bit blade 1 for use in a drill bit according to one embodiment of the present application is shown in FIGS. 3-8. The drill bit blade 1 is made of a hard alloy and is generally flat, welded on a bit body (not shown) for drilling hard materials such as ceramics, stones, metal, and hardwood.

Figure 1:
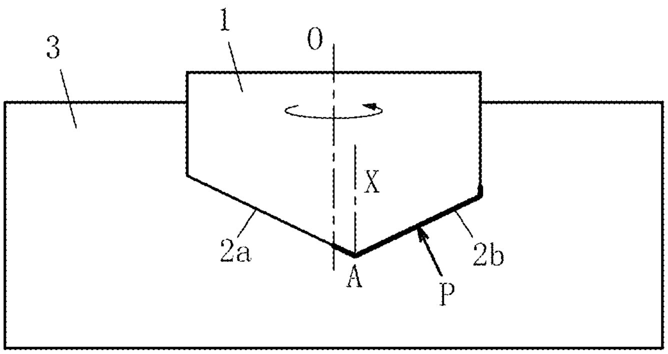
FIG. 1 (Prior art)
FIGS. 1 and 2 are schematic diagrams of some drill bit blades of the prior art.
Figure 2:
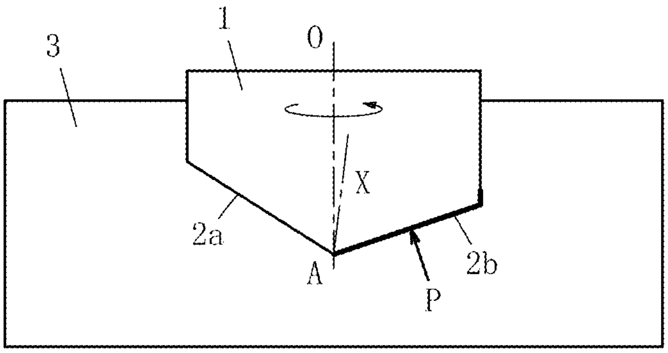
FIG. 2 (Prior art)
Figure 3:
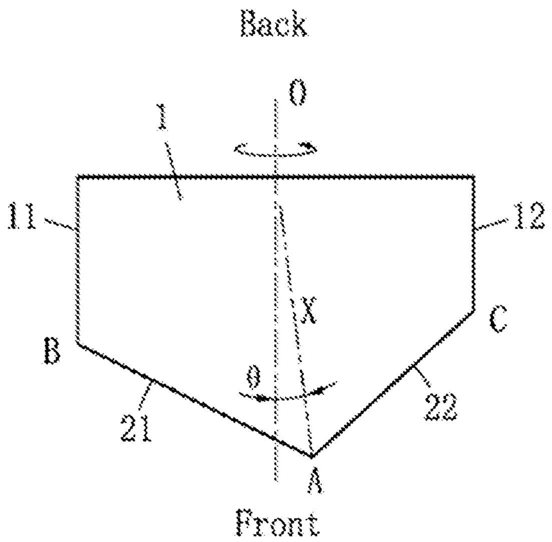
FIG. 3 is a front view of a drill bit blade according to one embodiment of the present application.

As shown in FIG. 3, the drill bit blade 1 defines a first side 11 and a second side 12. Optionally, in a state in which the drill bit blade 1 is mounted to the bit body (not shown), the first and second sides 11 and 12 are parallel to an axis of rotation O of the drill bit (i.e., the axis of rotation of the drill bit blade 1) and are located on lateral sides of the axis of rotation O at an equal lateral distance from the axis of rotation O. Certainly, the configuration of the first and second sides is limited thereto, and other conceivable configurations may also be applied to the present application. For example, the first and second sides may be parallel to each other, but not parallel to the axis of rotation. As another example, the first and second sides may not be parallel to each other.

The drill bit blade 1 also defines a first blade edge 21 positioned on a first lateral side and a second blade edge 22 positioned on a second lateral side. The two blade edges 21 and 22 meet at a tip point A, which is the most forward portion of the drill bit blade 1 and extend from the tip point A in opposite directions to terminal points B and C which are located on the sides 11 and 12 of the drill bit blade 1. The tip point A is laterally biased by a lateral distance from the axis of rotation O of the drill bit, and the drill bit rotates about the axis of rotation O during the drilling process. At the same time, an angular bisector X between the two blade edges 21 and 22 is inclined by an angle θ relative to the axis of rotation O. An inclination direction of the angular bisector X is that an intersection (or a nearest point) of the angular bisector X and the axis of rotation O is located at an axially rearward position of the tip point A.

In the present application, "front" refers to the direction in which the drill bit is drilled into the workpiece, i.e., the direction in which the drill bit is pointed; "rear" refers to the direction in which the drill bit is reversely pointed, i.e., towards the side of the drill shank.

The size of the tip point A laterally biased from the axis of rotation O of the drill bit, and the inclination angle θ of the angular bisector X relative to the axis of rotation O are designed in combination such that terminal points of the two blade edges 21 and 22 have desired different axial positions, e.g., such that the length difference between the two blade edges 21 and 22 is as small as possible (e.g., less than a preset length difference limit value), or there is even no difference. In the illustrated embodiment of FIG. 3, the tip point A is located on the second side of the drill bit blade 1 and a terminal point C of the second blade edge 22 is located rearward along the axial direction relative to a terminal point B of the first blade edge 21.

Figure 4:
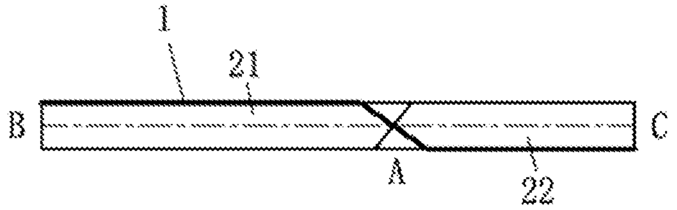
FIG. 4 is an enlarged bottom view of the drill bit blade of FIG. 3.

It will be understood that since the drill bit blade 1 has a certain thickness, the two blade edges 21 and 22 are typically in the form of gradual sharpening, that is, varying from the body thickness of the drill bit blade 1 to a sharp cutting edge. For some forms of the drill bit blade 1, the cutting edges of the two blade edges 21 and 22 are coplanar (e.g., both located in the center of the thickness direction of the blade edge), so that the coplanar cutting edges are used as references for easily measuring the size or angle, or defining the angular bisector between them. However, in some cases, the two blade edges 21 and 22 are not coplanar. For example, as shown in FIG. 4, the cutting edges of the first and second blade edges 21 and 22 (as indicated by the thick line in the figure) are located on opposite main surfaces of the drill bit blade 1, and the tip point A is formed at a transition site between the cutting edges of the first and second blade edges 21 and 22. Because the first and second blade edges 21 and 22 themselves have this thickness, when the two blade edges 21 and 22 are discussed in the present application in terms of size, angle, and position, and the angular bisector between them is defined, etc., the center line of the two blade edges 21 and 22 (center line between the terminal points B and C in FIG. 4) is used as a reference.

Figure 5:
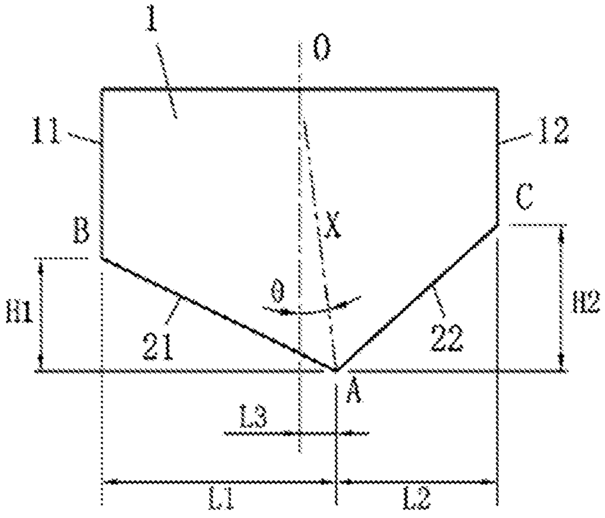
FIG. 5 is a schematic diagram defining a structural dimension of the drill bit blade of FIG. 3.

As shown in FIG. 5, the first and second blade edges 21 and 22 have first and second lateral dimensions L1 and L2 in the lateral direction and first and second axial dimensions H1 and H2 in the axial direction, respectively. The first lateral dimension L1 is greater than the second lateral dimension L2, and the first axial dimension H1 is smaller than the second axial dimension H2.

For most embodiments to which the present application is appliable, the lateral distances between the terminal points B and C and the axis of rotation O are equal.

The dimension L3 of the tip point A laterally biased from the axis of rotation O is greater than 0 and is less than the drilling radius of the drill bit. In an actual design, the dimension L3 of the tip point A laterally biased from the axis of rotation O being less than half or even ⅓ of the drilling radius of the drill bit is feasible.

The angle of inclination θ is set to be greater than 0 degrees. In the actual design, it may be feasible to select the angle of inclination θ to be less than 45 degrees, or even 30 degrees.

Figure 6:
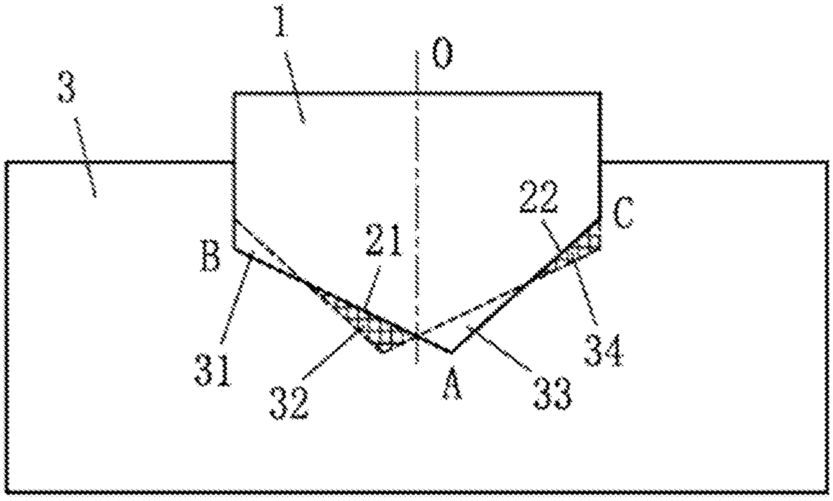
FIG. 6 shows two rotation positions of the drill bit blade in FIG. 3 in a state of not axially advancing.

To explain the technical effects of the previously described drill bit blade 1, two rotation positions of the drill bit blade 1 that differ from one another by 180 degrees are demonstrated in FIG. 6. The solid line represents the first rotation position of the drill bit blade 1 and the dashed line represents the second rotation position achieved after the drill bit blade 1 rotates about the axis of rotation O by 180 degrees. There is no axial position change between the two rotation positions in the figure.

As shown schematically in FIG. 6, in the second rotation position, some materials have been removed in the first rotation position by the second and first blade edges 22 and 21, 21 in the workpiece 3 facing the first and second blade edges 21 and 22 respectively. Thus, in the second rotation position, the second blade edge 22 faces an empty region (no material is available) 31 and an entity region (there is still a material as shown by the shaded line) 32, and the first blade edge 21 faces an empty region (no material is available) 33 and entity regions (there is still a material as shown by the shaded line) 34 and 32, so that the first and second blade edges only need to remove materials in the entity regions 34 and 32 they face respectively in the second rotation position.

Figure 7:
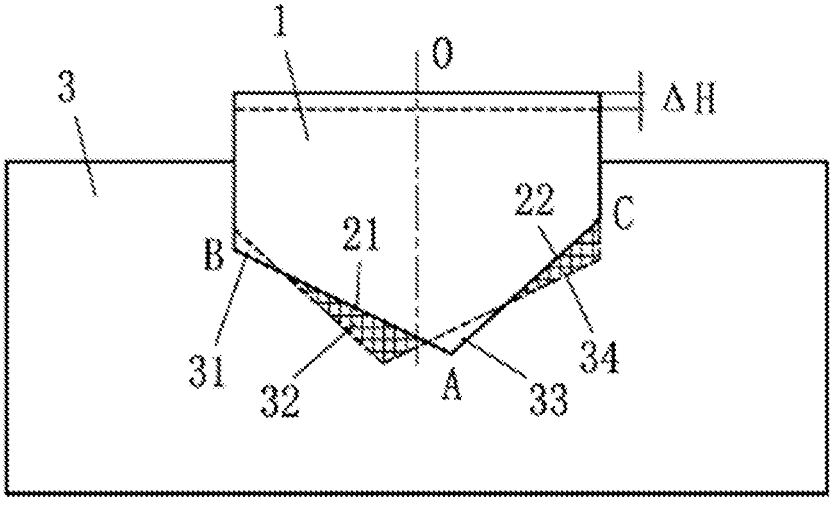
FIG. 7 shows two rotation positions of the drill bit blade of FIG. 3 in a state of axially advancing by a distance.

FIG. 7 shows two rotation positions taking into account axial advancing factors. In particular, in the second rotation position, the drill bit blade 1 moves by a distance of ΔH forward in the axial direction with respect to the first rotation position. As compared to the situation illustrated in FIG. 6, it can be seen that the entity regions 32 and 34 are larger and the empty regions 31 and 33 are smaller when there is an axial advancing distance. Based on this comparison, it can be deduced that the greater the axial forward thrust applied to the drill bit blade 1, the greater the portion on the first and second blade edges in which materials can be removed, and therefore the greater the drilling speed.

Figure 8:
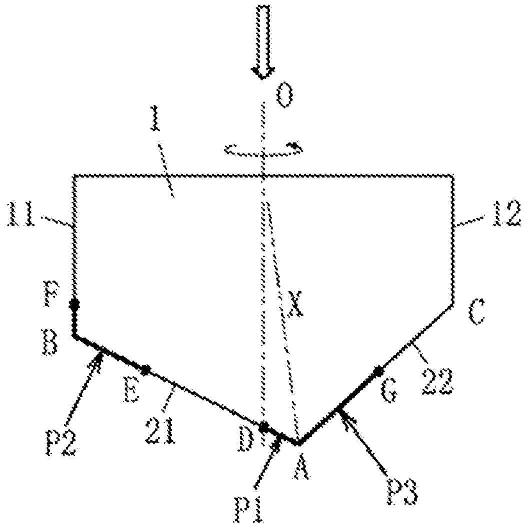
FIG. 8 shows a blade portion where the drill bit blade of FIG. 3 is in contact with a workpiece when drilling.

It can be seen from the foregoing description that, by using the drill bit blade 1 having blade edges that are inclined and are asymmetrical with respect to each other, at each moment in the drilling process, both the first blade edge and the second blade edge have only a portion that faces the entity region of materials for material removal, and a portion of the first blade edge or the second blade edge that faces the empty area is not used for material removal. The two blade edges of the drill bit blade 1 of the present application are not full-length for drilling, and only effective cutting lengths of the two blade edges (the portions of the two blade edges facing the entity region of material) are actually used for removing the material in the drilling. Effective cutting sections (shown in the thick and solid line) of the two blade edges are illustrated schematically in FIG. 8. In FIG. 8, the effective cutting section of the first blade edge 21 includes a section AD and a section BE, and the effective cutting section of the second blade edge 22 is a section AG. A section BF adjacent to the terminal point B on the first side 11 may also be involved in cutting. The points D and E are located on the first blade edge 21, the point G is located on the second blade edge 22, and the point F is located on the first side 11, which may be determined in the manners shown in FIGS. 6 and 7. Given different advancing speeds of the total drilling of the drill bit, the specific positions of these points are not fixed.

In contrast to traditional drill bit blades with a symmetrical structure, the two blade edges of the drill bit blade 1 of the present application are not full-length for drilling, and only effective cutting lengths of the two blade edges (the portions of the two blade edges facing the entity region of material) are actually used for removing the material in the drilling. The effective cutting length of each blade edge is less than its full length, so the pressure of the contact area between the blade edge and the workpiece material is increased and the drilling speed can be increased. In addition, there is no need to sharpen cutting edge of the blade edge to increase the drilling speed so that the life of the drill bit blade 1 can be extended.

Further, as can be seen from FIG. 8, the effective cutting sections AD and BE of the first blade edge 21 of the workpiece material and the effective cutting section AG of the second blade edge 22 act on the drill bit blade 1 with pressure P1, P2, and P3, respectively. The axial components of the pressure resist the axial thrust applied by the operator to the drill bit, while the radial (lateral) components of the pressure counteract each other, thereby at least partially counteracting the radial (lateral) thrust components of the material to which the drill bit blade 1 is subject so that the axis of rotation of the drill bit blade 1 remains undisturbed, thereby improving the drilling precision.

In determining the size of the tip point A laterally biased from the axis of rotation O of the drill bit, and the angle of inclination θ of the angular bisector X relative to the axis of rotation O, in addition to the previously described difference in length between the two blade edges 21 and 22 as much as possible, it may also be comprehensively considered that the difference between effective cutting lengths of the two blade edges in a conventional drilling operation is as small as possible (for example, less than a preset limit value of the difference between the effective cutting lengths), so that depletion of the two blade edges is as even as possible. This also helps prolong the life of the drill bit blade 1. Alternatively, it may be comprehensively considered that lateral components of the action force of the material from the workpiece that are borne by the two blade edges in the conventional drilling operation counteract each other as much as possible (for example, a lateral resultant force generated by the lateral components on both sides is less than a preset lateral force limit value).

Based on the principles described above, a variety of drill bit blade structures can be contemplated. For example, in the embodiment described above, the tip point A has a straight blade edge on each side; however, according to the modification of the present application, at least one of the two blade edges may be configured as a non-linear form with multiple segments.

Figure 9:
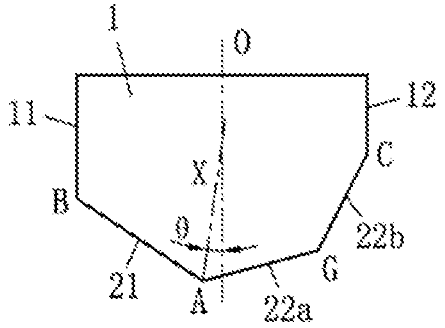
FIG. 9 is a schematic diagram of a drill bit blade according to another embodiment of the present application.

For example, in the embodiment shown in FIG. 9, the drill bit blade 1 includes a first blade edge 21 located on a first lateral side of the tip point A and a second blade edge located on a second lateral side of the tip point A, and the second blade edge includes first and second edge segments **22*a* and 22*b* angled from each other. The first blade edge 21 starts at a point A and ends at a point B on the first side 11 of the drill bit blade 1. The first and second edge segments 22*a* and 22*b* meet at a point G on the second side of the tip point A, the first edge segment 22*a* starts at the point A and ends at a point G, and the second edge segment 22***b* starts at the point G and ends at a point C on the second side 12 of the drill bit blade 1. In the axial direction, the axial position of the point G is between the tip point A and the point B, and the point C is at a different axial position than the point B. In addition, the axial and lateral positions of the point G are comprehensively set so that the point G forms a convex angle.

Further, the tip point A is laterally biased by a lateral distance from the axis of rotation O, and the angular bisector X between the first blade edge 21 and the first edge segment 22*a* of the second blade edge is inclined by an angle θ relative to the axis of rotation O. The inclination direction of the angular bisector X enables an intersection (or a nearest point) of the angular bisector X and the axis of rotation O to be located at an axially rearward position of the tip point A.

Figure 10:
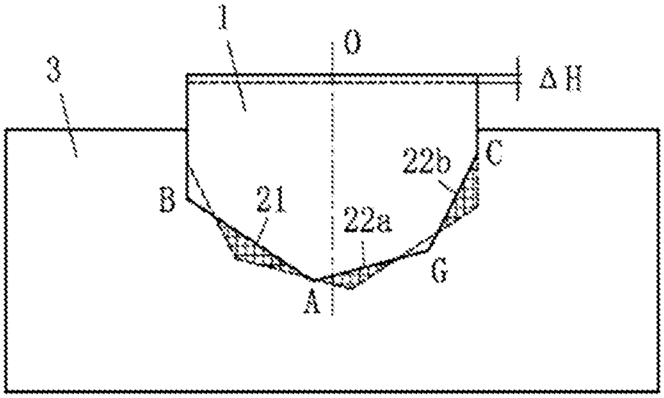
FIG. 10 shows two rotation positions of the drill bit blade of FIG. 9 in a state of axially advancing by a distance.

FIG. 10 illustrates schematically two rotation positions of the drill bit blade 1 shown in FIG. 9. In FIG. 10, the first rotation position of the drill bit blade 1 is represented by a solid line, and the second rotation position that has been rotated by 180 degrees with respect to the first rotation position about the axis of rotation O and that has advanced along the axial direction by a specific distance ΔH is represented by a dashed line.

As shown schematically in FIG. 10, in the second rotation position, the first and second blade edges each face a respective empty region (no material is available) and an entity region (there is still a material as shown by the shaded line), so the first and second blade edges only need to remove materials in the entity regions they face respectively in the second rotation position. Effective cutting sections of the blade edges on both sides of the drill bit blade 1 shown in FIG. 9 are represented by the thick and solid line in FIG. 11. It can be seen that there are effective cutting sections on both blade edges simultaneously, so the radial (lateral) components of the material pressure to which the two blade edges are subject can be biased at least partially from one another, and thus the drilling precision can be improved. Moreover, the length of the effective cutting section on each blade edge is less than the full length of that blade edge, and therefore the drilling speed may be increased.

Figure 11:
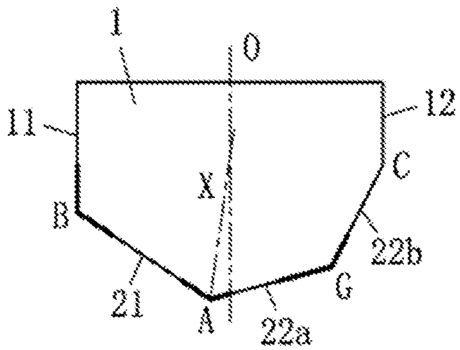
FIG. 11 shows a blade portion where the drill bit blade of FIG. 9 is in contact with a workpiece when drilling.

The features described in the previous embodiments with reference to FIGS. 3-8 are basically also applicable to the embodiments shown in FIGS. 9-11, which are not repeated here.

Figure 12:
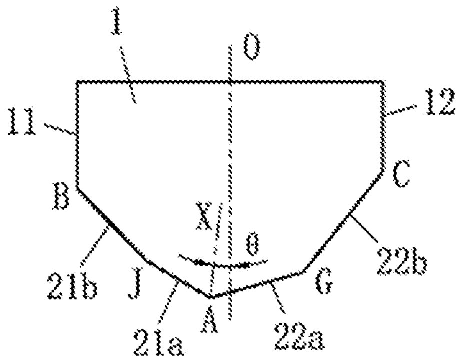
FIGS. 12 and 13 are schematic diagrams of a drill bit blade according to other embodiments of the present application.

In the illustrated embodiment of FIG. 12, a first blade edge positioned on a first lateral side of a tip point A consists of a first edge segment 21*a* and a second edge segment 21*b*, and a second blade edge positioned on a second lateral side of the tip point A consists of a first edge segment 22*a* and a second edge segment 22*b*. The first and second edge segments 21*a* and 21*b* meet at a point J. The first and second edge segments 22*a* and 22*b* meet at a point G. In the axial direction, the axial positions of the various points A, B, C, G, J are different from one another, and the points G and J form convex angles respectively. The tip point A is laterally biased by a lateral distance from the axis of rotation O, and the angular bisector X between the first blade edge 21 and the first edge segment 22*a* of the second blade edge is inclined by an angle θ relative to the axis of rotation O. The inclination direction of the angular bisector X is the same as that in the embodiment previously described. The features and technical effects described in the previous embodiments with reference to FIGS. 3-8 are basically also applicable to the embodiment shown in FIG. 12, which are not repeated here.

Figure 13:
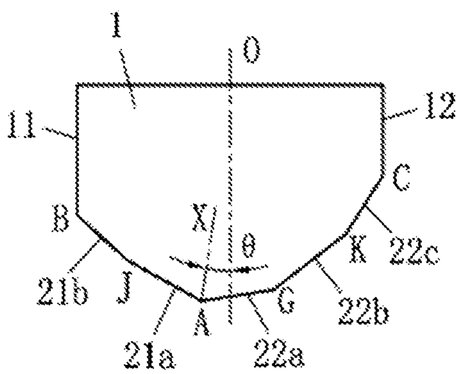

In the illustrated embodiment of FIG. 13, a first blade edge positioned on a first lateral side of a tip point A consists of a first edge segment 21*a* and a second edge segment 21*b*, and a second blade edge positioned on a second lateral side of the tip point A consists of a first edge segment 22*a*, a second edge segment 22*b*, and a third edge segment 22*c*. The first and second edge segments 21*a* and 21*b* meet at a point J. The first and second edge segments 22*a* and 22*b* meet at a point G and the second and third edge segments 22*b* and 22*c* meet at a point K. In the axial direction, the axial positions of the various points A, B, C, G, J, and K are different from one another, and the points G, J, and K form convex angles respectively. The tip point A is laterally biased by a lateral distance from the axis of rotation O, and the angular bisector X between the first edge segment 21*a* of the first blade edge 21 and the first edge segment 22*a* of the second blade edge is inclined by an angle θ relative to the axis of rotation O. The inclination direction of the angular bisector X is the same as that in the embodiment previously described. The features and technical effects described in the previous embodiments with reference to FIGS. 3-8 are basically also applicable to the embodiment shown in FIG. 13, which are not repeated here.

Other feasible embodiments can also be conceived.

In general, the drill bit blade of the present application includes first and second blade edges, both of which start at a blade tip point and end at laterally opposite sides of the drill bit blade. The tip point is laterally biased by al distance from the axis of rotation of the drill bit blade and the angular bisector between the first and second blade edges is inclined at an angle relative to the axis of rotation. The axial positions of terminal points of the two blade edges are different from one another. By combining these features, during the drilling process, only a portion of each of the first and second blade edges is in contact with each other and used for cutting the workpiece material. Therefore, compared with a symmetrical drill bit blade, pressure between the blade edge and the material is increased, and the drilling speed and efficiency can be increased.

In addition, there is no need to increase blade edge sharpness to increase the drilling speed, so the blade edge is more resistant to wear. Moreover, both blade edges are subject to wear during the drilling process, so the wear speeds of both blade edges are more balanced. These factors make it possible to extend the life of the drill bit blade.

Moreover, the radial (horizontal) components of the pressure from the material that the two blade edges are subject to during the drilling process may counteract each other to some extent so as to avoid the misalignment of the drill bit due to the lateral thrust of the material, which increases the drilling precision.

While the present application is described herein with reference to specific exemplary embodiments, the scope of the present application is not limited to the details shown. Various modifications may be made to these details without departing from the principles of the present application.

The invention claimed is:

1. A drill bit blade for drilling a material, the drill bit blade defining an axis of rotation, the drill bit blade comprising:

a first side positioned on a first lateral side of the axis of rotation;

a second side positioned on a second lateral side of the axis of rotation, wherein the drill bit blade is flat between said first and second side;

a blade tip point that is laterally biased by a lateral bias distance relative to the axis of rotation;

a first blade edge starting at the blade tip point and ending at the first side; and a second blade edge starting at the blade tip point and ending at the second side, wherein the drill bit blade is flat at least between said first and second blade edges, wherein an angular bisector between the first blade edge and the second blade edge is inclined at an angle of inclination relative to the axis of rotation, wherein the lateral bias distance and the angle of inclination are configured in combination such that, during a drilling process, the first blade edge and the second blade edge each have an effective cutting section that is involved in drilling of a workpiece material and a non-cutting section that is not involved in the drilling of the workpiece material; and wherein axial positions of a first terminal point of the first blade edge and a second terminal point of the second blade edge on the first side and the second side, respectively, are different from one another.

2. The drill bit blade according to claim 1, wherein an inclination direction of the angular bisector is set such that an intersection of the angular bisector to the axis of rotation is axially rearward relative to the blade tip point.

3. The drill bit blade according to claim 1, wherein:

the blade tip point is biased from the axis of rotation toward the second lateral side, and the axial position of the second blade edge on the second terminal point is rearward relative to the axial position of the first blade edge on the first terminal point.

4. The drill bit blade according to claim 1, wherein the lateral bias distance and the angle of inclination are further configured in combination to achieve one or more of the following optimization objectives:

a difference between a length of the first blade edge and a length of the second blade edge is less than a preset length difference limit value;

during the drilling process, a difference between an effective cutting section length of the first blade edge and an effective cutting section length of the second blade edge is less than a preset effective cutting section length difference limit value; and during the drilling process, lateral components of an active force from the workpiece material born by the first and second blade edges counteract each other so that the lateral components on both blade edges produce a lateral counter-force that is less than a preset lateral force limit value.

5. The drill bit blade according to claim 1, wherein the lateral bias distance is greater than zero (0) and less than a drilling radius of the drill bit.

6. The drill bit blade according to claim 1, wherein the angular bisector between the first blade edge and the second blade edge is inclined at an angle greater than 0 degrees and less than 45 degrees relative to the axis of rotation.

7. The drill bit blade according to claim 1, wherein at least one of the first blade edge and the second blade edge includes at least two sequentially connected edge segments that are angled relative to each other.

8. A drill bit for drilling a material, comprising:

a drill bit body; and a drill bit blade mounted onto the drill bit body, the drill bit blade defining an axis of rotation, and the drill bit blade comprising:

a first side positioned on a first lateral side of the axis of rotation, a second side positioned on a second lateral side of the axis of rotation, wherein the drill bit blade is flat between said first and second side, a blade tip point that is laterally biased by a lateral bias distance relative to the axis of rotation, a first blade edge starting at the blade tip point and ending at the first side, and a second blade edge starting at the blade tip point and ending at the second side, wherein the drill bit blade is flat at least between said first and second blade edges, wherein an angular bisector between the first blade edge and the second blade edge is inclined at an angle of inclination relative to the axis of rotation, wherein the lateral bias distance and the angle of inclination are configured in combination such that, during a drilling process, the first blade edge and the second blade edge each have an effective cutting section that is involved in drilling of a workpiece material and a non-cutting section that is not involved in the drilling of the workpiece material; and wherein axial positions of a first terminal point of the first blade edge and a second terminal point of the second blade edge on the first side and the second side, respectively, are different from one another.

9. The drill bit according to claim 8, wherein:

the blade tip point is biased from the axis of rotation toward the second lateral side, and the axial position of the second blade edge on the second terminal point is rearward relative to the axial position of the first blade edge on the first terminal point.

* * * * *